(12) United States Patent
Isaac et al.

(10) Patent No.: US 7,133,995 B1
(45) Date of Patent: Nov. 7, 2006

(54) DYNAMIC PAGE CONFLICT PREDICTION FOR DRAM

(75) Inventors: Roger Isaac, Austin, TX (US); Benjamin T. Sander, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 261 days.

(21) Appl. No.: 10/320,034

(22) Filed: Dec. 16, 2002

(51) Int. Cl.
*G06F 12/00* (2006.01)

(52) U.S. Cl. .................. 711/204; 711/167; 711/210

(58) Field of Classification Search .......... 711/105, 711/152, 210, 204, 167
See application file for complete search history.

(56) References Cited

U.S. PATENT DOCUMENTS

| | | | | |
|---|---|---|---|---|
| 5,715,203 A | * | 2/1998 | Uchida ................... | 365/203 |
| 5,889,714 A | * | 3/1999 | Schumann et al. ......... | 365/203 |
| 6,363,460 B1 | | 3/2002 | Jeddeloh ................. | 711/154 |
| 6,401,180 B1 | * | 6/2002 | Hartmann ................ | 711/167 |
| 6,526,502 B1 | * | 2/2003 | Col et al. ............... | 712/239 |
| 2001/0020267 A1 | * | 9/2001 | Koino ................... | 712/239 |

OTHER PUBLICATIONS

"The Authoritative Dictionary of IEEE Standards Terms," 7th edition, IEEE Press Publications, 2000.*

* cited by examiner

*Primary Examiner*—Pierre Bataille
*Assistant Examiner*—Sheng-Jen Tsai
(74) *Attorney, Agent, or Firm*—Robert C. Kowert; Meyertons, Hood, Kivlin, Kowert & Goetzel, P.C.

(57) ABSTRACT

A memory controller may be implemented using dynamic page conflict prediction to control the closure of memory pages. A memory controller may include a page history register configured to store a value indicating the pattern of page conflicts encountered by a memory device. The memory controller may include a global conflict predictor for storing probabilities of page conflicts associated with values of the page history register. In response to receiving a memory access request, a control unit may be configured to determine whether the memory access request causes a page conflict. The memory controller may be configured to update the global conflict predictor based on this determination. If a page conflict is predicted, the memory controller may automatically close the targeted page (e.g., by initiating the memory access in auto-precharge mode) upon completion of the memory access requested by the memory access request.

33 Claims, 5 Drawing Sheets

DYNAMIC PAGE CONFLICT PREDICTION FOR DRAM

BACKGROUND OF THE INVENTION

1. Field of the Invention

This invention relates to computer systems and, more particularly, to paging policies used in memory systems.

2. Description of the Related Art

DRAM (Dynamic Random Access Memory) devices are often divided up into banks. A bank of memory typically includes an array of rows and columns of memory elements. The memory elements included in a particular bank and row are called a page. In order to access data within a page of memory, the page is activated, or opened, which loads the contents of the page from the memory array into a buffer (e.g., a sense amplifier) on the memory chip being accessed, allowing a read or write access to data within that page to take place.

Once a page is open, a subsequent request to access data within that page can be performed without needing to reopen the page. This scenario is called a page hit. A page hit has low latency because there is no need to open the page before the requested access can take place. A scenario in which a subsequent request to a different, inactive page within a bank that already has an active page is received is called a page conflict. Page conflicts have a higher latency because they require that the currently open page be closed (e.g., by precharging the bank) and the requested page must then be opened before the requested access can take place. Additionally, if a prior request that activated the currently open page has not yet completed, the conflicting request will be stalled because the bank cannot be closed until the prior request completes.

Various paging policies have been developed to control when open pages are closed. These paging policies have been designed in order to either benefit from page hits or to decrease the likelihood of page conflicts. One paging policy is a closed paging policy. In a closed paging policy, pages are closed as soon as each access completes. While a closed paging policy reduces the risk of page conflicts occurring, it also reduces the likelihood of page hits.

Another paging policy is called an open paging policy. In an open paging policy, a page is left open after the current request completes. The page is closed when a page conflict is detected. An open paging policy is effective and efficient if the majority of the requests to the memory are expected to produce page hits, since these requests can then be satisfied by simply performing the read or write operation to the already-opened page. This policy may be substantially less effective and efficient, however, if the majority of the memory requests cause page conflicts. As mentioned above, page conflicts have longer latency, especially if the prior request has not completed yet. As a result, an open paging policy creates a risk of a significant performance loss.

A less-risky version of an open paging policy involves leaving a page open for a certain number of clock cycles before closing the page. This modified open paging policy is typically implemented by initializing a counter to a preselected threshold value when a page is opened and decrementing the counter each subsequent clock cycle that the page remains open. If the page is not accessed before the counter expires, the page is closed. This paging policy may improve performance, but it may still offer less than optimal performance in response to different memory access patterns. For example, if a series of page hits would have occurred if the threshold value had been higher, this paging policy is less efficient than an open paging policy. Similarly, if a series of page conflicts would not have occurred if the threshold value had been lower, this paging policy is less efficient than a closed paging policy. Furthermore, if both types of access patterns are expected to occur, it may be difficult to select an ideal threshold value. Accordingly, it is desirable to be able to implement an improved paging policy.

SUMMARY

Various embodiments of a memory controller may be implemented using dynamic page conflict prediction to control the closure of memory pages. In one embodiment, a memory controller may include a page history register, a global conflict predictor, and a control unit. The page history register may be configured to store a value indicating the history of memory access requests. For example, the page history register may store a pattern of N ones and zeros that respectively indicate whether a respective one of N memory access requests resulted in a page conflict or not. The global conflict predictor may include several conflict prediction registers that are each associated with a possible value of the page history register. Each conflict prediction register may, in some embodiments, store the probability of a page conflict occurring, given the occurrence of the respective value of the page history register. In response to receiving a memory access request, the control unit may be configured to update the value of the page history register. The memory controller may be configured to update the conflict prediction register associated with the value of the page history register dependent on whether the memory access request causes a page conflict. The control unit may also be configured to determine whether to automatically close the page targeted by the memory access request as soon as the memory access completes in response to a value in one of the conflict prediction registers. For example, the control unit may be configured to automatically close the page upon completion of the requested memory access if the value in the conflict prediction register is greater than a threshold value.

In one embodiment, the page history register may include J bits. After the control unit updates the page history register, one bit may correspond to whether the memory access request causes a page conflict. The other J–1 bits may each correspond to whether a respective one of J–1 previous memory access requests caused page conflicts. In such an embodiment, the global page predictor may include $2^{J-1}$ conflict prediction registers, each corresponding to a value of the J–1 bits of the page history register. The page history register may be implemented in a shift register. The control unit may be configured to update the value of the page history register by shifting a bit representing whether the memory access request causes a page conflict into the shift register.

In some embodiments, the global conflict predictor may be updated by increasing the value of the conflict prediction register corresponding to the value of the page history register if the current memory access request causes a page conflict and decreasing the value if the access does not cause a page conflict.

In one embodiment, the conflict prediction register associated with the value of the page history register may be the same conflict prediction register whose value is used by the control unit to determine whether to automatically close the page addressed by the memory access request upon completion of the requested access.

The control unit may be configured to automatically close the page upon completion of the memory access by initiating the memory access in auto-precharge mode.

In some embodiments, the memory controller may include several page history registers. Each page history register may correspond to a different bank within a memory device controlled by the memory controller.

One embodiment of a computer system may include a memory device having several memory banks, each of which includes several memory pages, and a memory controller. The memory controller may include a control unit, a page conflict history register, and several conflict prediction registers. Each of the conflict prediction registers may be associated with a possible value of the page conflict history register. In response to a memory access request targeting one of the pages in the memory device, the control unit may be configured to access one of the conflict prediction registers associated with the value of the page conflict history register to predict whether the next memory access request will cause a page conflict. If the control unit predicts that the next memory access request will cause a page conflict, the memory controller may be configured to automatically close the page targeted by the memory access request upon completion of the requested access. Furthermore, dependent on whether the memory access request causes a page conflict, the control unit may be configured to update one of the conflict prediction registers and to update the page history register. For example, the control unit may increase the value of a conflict prediction register if the memory access request causes a page conflict and decrease the value of the conflict prediction register otherwise. Similarly, in one embodiment, the control unit may shift one value into the page conflict register if the memory access request causes a page conflict and shift another value into the page conflict register otherwise.

In some embodiments, the conflict prediction register updated by the control unit is associated with the value of the page conflict history register prior to the control unit updating the page conflict history register. The conflict prediction register accessed by the control unit to predict whether the next memory access request will cause a page conflict may be associated with a value of the page conflict history register subsequent to the control unit updating the page conflict history register.

One embodiment of a method may involve: receiving a memory access request targeting a page of memory; modifying one of several conflict predictions dependent on whether the memory access request causes a page conflict; updating a page history to indicate whether the memory access request causes a page conflict; predicting whether a next memory access request will cause a page conflict dependent on one of the conflict predictions associated with a value of the page history; and, if it is predicted that the next memory access will cause a page conflict, automatically closing the page targeted by the memory access request upon completion of a memory access initiated in response to receiving the memory access request.

BRIEF DESCRIPTION OF THE DRAWINGS

A better understanding of the present invention can be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
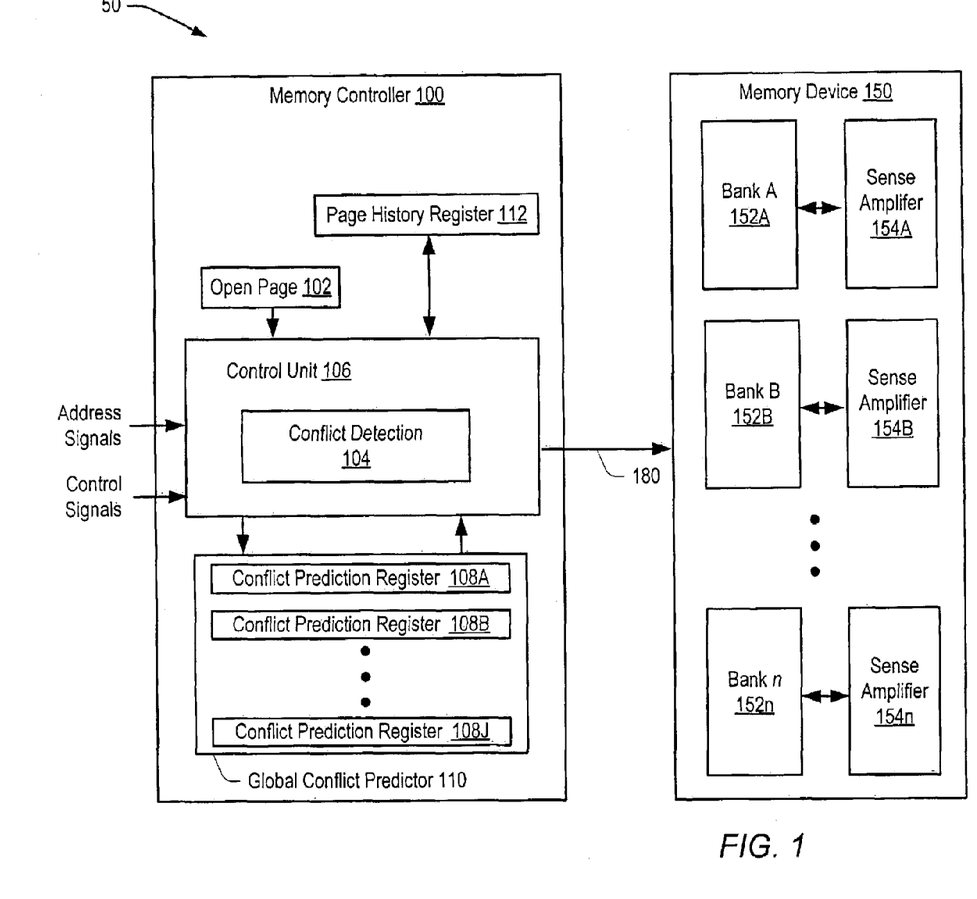
FIG. 1 illustrates a memory system that performs dynamic page conflict prediction, according to one embodiment.

FIG. 1 illustrates a memory system 50 that performs dynamic page conflict prediction, according to one embodiment. The memory controller 100 may determine for each memory access request whether the request causes a page conflict. Memory controller 100 may also track the history of memory access requests causing page conflicts and use this history to predict whether the next memory access request is likely to cause a page conflict. If the memory controller 100 predicts that the next memory access will cause a page conflict, the memory controller 100 may automatically close the page addressed by the current memory access request as soon as the requested access completes. Automatically closing the page may reduce the effect of the page conflict on the efficiency of memory system 50 if the page conflict is correctly predicted.

Memory system 50 may include a memory controller 100 and a memory device 150. Memory device 150 may be a DRAM device such as DDR SDRAM (Double Data Rate Synchronous DRAM), VDRAM (Video DRAM), RDRAM (Rambus DRAM), etc. Note that components referred to by the same reference numeral followed by an alphabetic identifier (e.g., memory banks 152A–152N) may be collectively referred to by that reference numeral alone (e.g., memory banks 152). Memory device 150 includes N banks of memory 152A–152N and N sense amplifiers 154A–154N. Each bank 152 is coupled to a respective sense amplifier 154. Each of the N banks includes multiple memory elements each configured to store one or more bits of data. The memory elements within each bank may be organized into pages. For example, in a memory device 150 that is addressable by rows and columns, each page may include a row of memory elements included in a particular bank. The contents of a page of memory elements may be read or written by outputting that page's contents to the appropriate sense amplifier 154. Each sense amplifier 154 may include a storage element for each bit in a page. Note that memory device 150 may include multiple memory modules (e.g., SIMMs or DIMMs). Each memory module may include one of more of the banks 152A–152N. A page is defined as being "open" if it has been activated into a sense amplifier or another suitable buffer such as a register from which that page can be accessed. A pre-charge operation to a bank closes any page that is currently open within that bank.

Memory controller 100 includes a control unit 106 that receives address and control signals from devices requesting access to memory device 150. When memory controller 100 receives a memory request (e.g., from a CPU or graphics controller across a system bus), control unit 106 may decode a received address into an appropriate address form for memory device 150. For example, in one embodiment, control unit 106 may determine the bank, row, and column corresponding to the received address and generate signals 180 that identify that bank, row, and/or column to memory device 150. Signals 180 may also identify the type of access being requested. Control unit 106 may determine what type of signals 180 to generate based on the current state of the memory device 150 and the type of access currently being requested (as indicated by the received control signals). Signals 180 may be generated by asserting and/or deasserting various control and/or address signals.

In some embodiments, the address may be supplied to the memory device 150 in two phases: a row address and a column address. The control unit 106 may generate signal(s) 180 representing a portion of the address to the appropriate memory bank(s) and strobe one or more row address strobe (RAS) signals. Strobing RAS opens a memory page within one or more of the memory banks 152A–152N. A memory location within a memory page may be selected for access by control unit 106 generating a column address to memory device 150 and strobing one of the column address strobe (CAS) signals to the appropriate memory bank. If a read access is being performed, the selected data for the memory location addressed within the open memory page may then be output (e.g., onto a system bus). Write accesses may be performed in a similar manner except data may be supplied to the memory device 150 and the control unit 106 may generate a write enable signal. Control unit 106 is an example of a means for accessing a page of memory.

A page hit occurs when the new access requests access to a page that is already open in one of the sense amplifiers 154. If a page hit is detected for a new access request, control unit 106 may send signals 180 to the memory device 150 indicating that the requested type of access should be performed on data already loaded in the sense amplifier (e.g., the control unit 106 may generate a column address, and strobe a CAS signal), potentially reducing access time. Page hit accesses may be performed in rapid succession by access cycles called bursts.

A page miss occurs when the new access request accesses a page that is not already open in one of the sense amplifiers 154 and the requested page is included in a bank 152 that does not currently have an open page. In this case, the control unit 106 may generate signals 180 (e.g., strobe RAS and generate a row address) indicating that the requested page should be opened in order to cause memory device 150 to load the requested page into a sense amplifier 154. The control unit 106 may generate signals identifying which portion of the page is being accessed as well as a control signal indicating what type of access is taking place (e.g., the control unit 106 may send a column address, strobe the appropriate CAS signal, and assert or deassert WE) in order to perform the requested access once the page is open.

If the requested page is included in a bank that already has an open page, and if the open page is not the requested page, a page conflict is detected. Before the requested page can be opened, the open page should be closed (unless the data in the open page is being copied to the requested page). Thus, in order to perform the requested access, the memory controller 100 may generate signals that cause memory device 150 to close the currently open page. For example, the signals 180 may cause the memory device 150 to precharge a bank (e.g., by deactivating a signal line used to select the currently open page and equalizing the inputs to the sense amplifiers coupled to that bank). Then, the requested page may be opened and accessed in the same way as described above for a page miss. Thus, responding to a page conflict requires the time needed to respond to a page miss in addition to the time needed to close the previously accessed page, making it the most time consuming form of memory access. It is therefore desirable to avoid the occurrence of page conflicts in order to increase the efficiency of memory systems.

Control unit 106 may be coupled to a global conflict predictor 110, a page history register 112, and an open page register 102. Open page register 102 may store a value identifying a recently opened page in memory device 150. Conflict detection mechanism 104 may determine whether the current memory access request resulted in a page conflict based on the value contained in the open page register 102 along with the state of the address and control signals associated with the current memory access request. Conflict detection mechanism 104 is an example of a means for determining whether a memory request causes a page conflict. For example, conflict detection mechanism 104 may detect a page conflict for the current request if the current request targets a page within a bank that currently has another page open.

The page history register 112 may contain J bits. One of the J bits may contain a value corresponding to the output of the conflict detection mechanism 104 for the current memory access request. In one embodiment, this value may be a one if the current memory access request causes a page conflict and a zero if the current memory access request does not cause a page conflict. The other J–1 bits may contain values corresponding to whether the previous J–1 memory access requests to the bank caused page conflicts.

In one embodiment, the page history register 112 may be a shift register. The first (e.g., the leftmost or rightmost) bit of this J-bit shift register may contain the value corresponding to whether the current memory access request causes a page conflict. The second bit may contain a value corresponding to whether the previous memory access request caused a page conflict, etc. such that the Jth bit may contain a value corresponding to whether the $J-1^{st}$ previous memory access caused a page conflict. The second through Jth bits of the page history register 112 constitute the history of previous accesses to the bank. Updating the page history register 112 may include shifting the register by one bit. The control unit 106 is an example of a means for updating the page history.

Before any modifications are made to the value in the page history register 112, the value may be a default value. The page history register 112 may be initialized to the default value each time the memory controller 100 is powered on. The default value may indicate no conflicts, all conflicts, or some other pattern of conflicts.

The global page predictor 110 may include a set of conflict prediction registers 108. In one embodiment, the page history register 112 may contain J bits and the global page predictor may include $2^{J-1}$ conflict prediction registers 108. Each conflict prediction register 108 may correspond to a possible pattern of data in the previous history field (e.g., bits 2 through J) of the page history register 112. The possible values contained in a conflict prediction register 108 may correspond to levels of certainty or confidence that the next memory access request will cause a page conflict based on the pattern of previous page conflicts recorded in the previous history field of the page history register 112. For example, if the values in a conflict prediction register 108 can range from 1 to 10, a value of 1 may correspond to a very low predicted likelihood that the next memory access request will cause a page conflict, while a value of 10 may indicate an extremely high predicted likelihood that the next memory access request will cause a page conflict. The current value of a conflict prediction register may indicate the confidence in a prediction that the next memory access request will cause a page conflict, given an associated pattern of conflicts.

A conflict prediction register 108 may be updated by a variety of methods. In one embodiment, a conflict prediction register 108 may be implemented as a counter. The control unit 106 may update the value of the conflict prediction register 108 based on whether the current memory access request causes a page conflict. When the current memory access request causes a page conflict, the control unit 106 may increment the conflict prediction register 108 associated with the bit pattern contained in the previous history field of the page history register 112. Likewise, if the current memory access request does not cause a page conflict, the control unit may decrement the conflict prediction register 108. In other embodiments the control unit 106 may update the conflict prediction register 108 in a manner opposite to the one previously described if a larger value is interpreted as less confidence that the next memory access request will result in a page conflict. The control unit 106 is an example of a means for updating the conflict prediction.

In some embodiments, there may be a minimum value that may be stored in the conflict prediction register 108. For example, the minimum value may be zero. In some embodiments a zero value may indicate the lowest probability that the next memory access request will result in a page conflict and therefore, the lowest level of confidence that the page associated with the current memory access request should be closed as soon as the current access completes. In other embodiments a zero value may indicate the highest probability that the next memory access request will result in a page conflict. The control unit 106 may be configured not to decrease the value in the conflict prediction register 108 below the minimum allowable value (e.g., the control unit 106 may inhibit modification of the conflict prediction register's 108 value if doing so would decrease the value below the minimum value).

Similarly, a maximum value may also be provided (e.g., the maximum value may be the maximum value that can be stored in the conflict prediction register 108, as determined by size of the conflict prediction register) which may indicate the highest probability that the next memory access request will result in a page conflict and therefore, the highest level of confidence that the page associated with the current memory access request should be closed as soon as the current access completes. The control unit 106 may be configured to not increase the value in the conflict prediction register 108 beyond the maximum allowable value (e.g., the control unit 106 may inhibit modification of the conflict prediction register's 108 value if doing so would increase the value beyond the maximum value).

Before any modifications are made to the value in the conflict prediction register 108, the value may be a default value. The conflict prediction register 108 may be initialized to the default value each time the memory controller 100 is powered on. The default value may equal a minimum or maximum conflict prediction register 108 value in some embodiments.

One or more of the conflict prediction registers 108 included in the global conflict predictor may be updated in response to each memory access request. In some embodiments, exactly one of the conflict prediction registers 108 included in the global conflict predictor may be updated in response to each memory access request. The control unit 106 may update the value of the conflict prediction register 108 based on whether the previous page conflict prediction was correct. The control unit 106 may determine whether the previous page conflict prediction was correct by interpreting the value contained in the conflict prediction register 108 corresponding to the previous history field of the page history register 112. This interpretation may include comparing the value of the conflict prediction register 108 to a threshold value. For example, the control unit 106 may establish one of the possible values for the conflict prediction register 108 as a threshold value. Values below the threshold value may be interpreted as a prediction that the next memory access request will not cause a page conflict, whereas values greater than or equal to the threshold value may be interpreted as a prediction that the next memory access request will cause a page conflict. A correct prediction may result from the current memory access request causing a page conflict and the prediction of a page conflict based on the previous history field of the page history register 112. A correct prediction may also result from the current memory access request not causing a page conflict and a non-conflict prediction from the previous history field. Incorrect predictions result from the page conflict status of the current memory access request being contrary to that predicted based on the previous history field.

In some embodiments the conflict prediction register 108 may be implemented as a general-purpose register rather than as a counter. The control unit 106 may be able to change the value in the conflict prediction register by any desired amount. In some embodiments, the control unit 106 may increase the value of the conflict prediction register 108 by a certain constant amount in response to a correct prediction of a page conflict. Likewise, for a correct prediction that a page conflict will not occur, the control unit 106 may decrease the value of the conflict prediction register 108 by the same constant amount. In the case of an erroneous prediction, the control unit 106 may change the value of the conflict prediction register 108 by a different constant amount. In other embodiments, the amount by which the value in the conflict prediction register 108 is increased or decreased may vary depending on the number of consecutive page conflicts that have occurred. For example, the amount by which the value is increased may increase each time there is another consecutive conflict. As another example, the amount by which the conflict prediction value is modified may vary exponentially depending on the number of consecutive page conflicts that have been detected. Other embodiments may update the value in other ways.

The control unit 106 may use the page history register 112 to obtain a prediction as to whether the next memory access request will cause a page conflict as described above. If the next memory access request is predicted to cause a page conflict, it may be desirable to close the page addressed by the current memory access request at the conclusion of the current access in order to reduce the effects of the page conflict on the efficiency of the memory system 50. The control unit 106 may perform this function by initiating the current memory access in auto precharge mode. If the next memory access request is not predicted to cause a page conflict, the control unit 106 may initiate the current memory access without auto precharge, thus leaving the accessed page open after the completion of the current memory access. Control unit 106 is an example of a means for closing the page associated with a memory access request upon completion of the memory access.

Auto precharge mode is a mode for accessing a memory device 150 wherein a memory access command is issued to the device with an indication that upon completion of the access, the bit lines associated with the accessed word are to be equalized, thus automatically closing the page addressed by the access. In embodiments that do not support the auto precharge mode of access, an explicit close command may be sent to the memory device 150 upon the completion of the requested memory access in order to effect the same result.

As the value of a conflict prediction register is changed over time in response to several memory access requests, the ability of the control unit 106 to correctly predict page conflicts based on this value may be improved, in some embodiments. By closing pages in banks for which a page conflict is predicted prior to receiving the next memory access, the occurrence of page conflicts may be reduced. Thus, dynamic modification of conflict prediction values may allow a memory controller 100 to increase memory access efficiency by adjusting its paging policy to suit current memory access patterns.

If the same page history register 112 stores a value for access histories for pages within two or more different banks 152, variation in access patterns to different banks within memory device 150 may cause a sub-optimal value to be stored in that page history register 112. For example, if one bank 152A is receiving a stream of requests that are resulting in a large number of consecutive page conflicts while another bank 152B is receiving a stream of requests that result in a large number of consecutive page hits, and the same page history register 112 is used to store a value for the access history of both banks, the value in the page history register 112 may be a value that provides less than optimal performance for both request streams.

Figure 2:
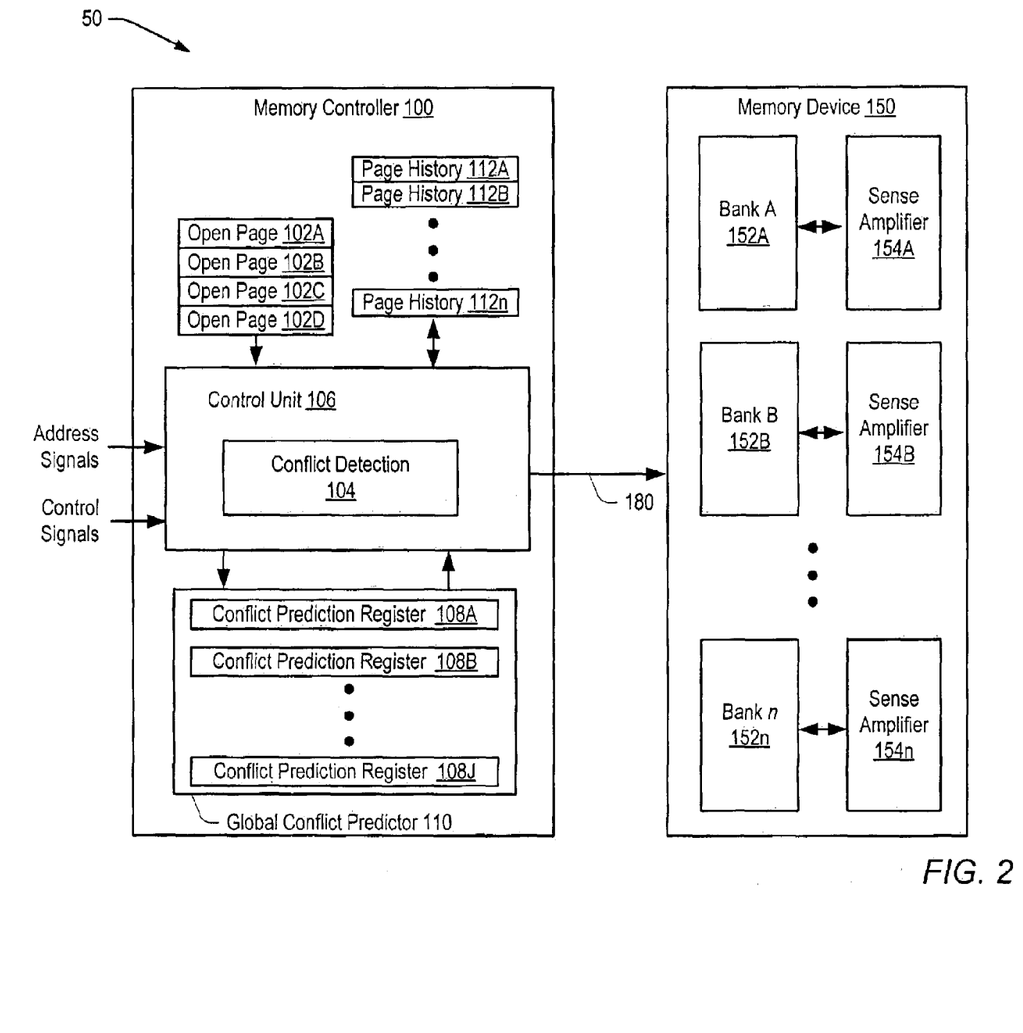
FIG. 2 illustrates a memory system that performs dynamic page conflict prediction, according to another embodiment.

Alternative embodiments, like that shown in FIG. 2, may include a page history register 112 for each bank 152 within memory device 150 (or, if memory device 150 includes fewer than the maximum number of banks supported by memory controller 100, memory controller 100 may include a page history register 112 for each of the maximum number of supported banks). In some embodiments, memory controller 100 may include a page history register 112 for each supported bank 152 even if the memory controller 150 does not allow all of the banks to have an open page at the same time. In other embodiments memory controller 100 may include fewer page history registers 112 than the number of supported banks 152.

In the embodiment of a memory system 50 shown in FIG. 2, the memory controller may include page tracking logic (e.g. open page registers 102A–102D) to track four open pages at a time. However, there are N page history registers 112A–112N, one for each of the N banks 152 that the memory controller is capable of controlling.

To illustrate, assume a page within bank 152B is opened in response to an access request. When the page is opened, the page identifier of that page may be loaded into one of the open page registers, e.g., open page register 102C. The value stored in the page history register 112B representing the access history of bank 152B may be used to determine whether the page is closed immediately after the current access is completed. Tf a page conflict is detected (e.g., if access to another page within bank 152B is requested while the first page is still open) by conflict detection mechanism 104, the value in the conflict prediction register 108 associated with the value in the page history register 112B may be increased. The page history register 112 may be updated to reflect the page conflict of the current memory access request in its previous history field and the updated value may be used to index the global conflict predictor 110. In other embodiments, the previous history field may be used to index the global conflict predictor 110 to make a conflict prediction before the page history register 112 is updated.

If the value in the conflict prediction register 108 associated with the bit pattern in the previous history field of the page history register 112 is above a threshold value, then the requested page in bank 152B may be closed upon completion of the requested access because the next memory access request to bank 152B is predicted to cause a page conflict. If, in response to the next memory access request, a page in another bank 152A is opened, open page register 102C may be used to track that page, but the value stored in the page history register 112B may remain unchanged. Accordingly, even when a bank 152 does not have an open page, that bank's page history value may be saved in a respective page history register 112, allowing its access pattern history to be used to determine the paging policy for that bank the next time a page within that bank is opened. Furthermore, since each bank has its own page history register 112, one bank's current memory access pattern may not adversely affect the value stored in another bank's page history register.

Figure 3:
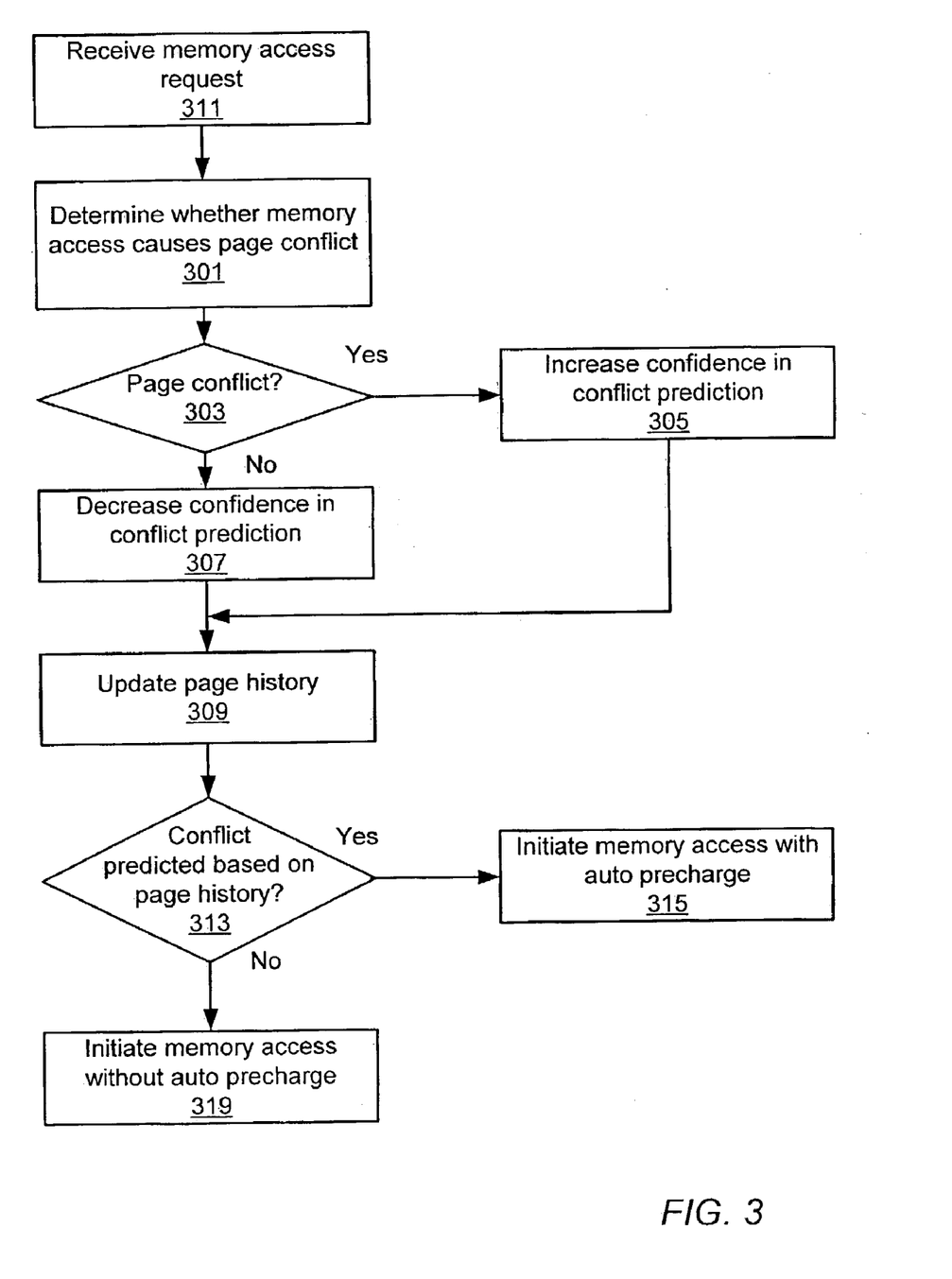
FIG. 3 is a flowchart of one embodiment of a method of operating a memory system.

FIG. 3 illustrates one embodiment of a method for implementing a paging policy in a memory system including dynamic page conflict prediction. Upon receiving a memory access request at 311, the memory system may determine at 301 whether the current memory access causes a page conflict. If at 303 the current memory access causes a page conflict, the confidence in conflict prediction may be increased, as shown at 305. If the current memory access does not cause a page conflict, as determined at 303, the confidence in conflict prediction may be decreased, as shown at 307. In either case, the page history may be updated at 309. Based on the page history, a prediction may be made as to whether the next memory access to this bank will cause a page conflict. If at 313 the next memory access is predicted to cause a page conflict, the memory controller may initiate a memory access in auto-precharge mode at 315. Initiating the memory access in auto-precharge mode closes the accessed page at the conclusion of the memory access. At 313, if the next memory access is not predicted to cause a page conflict, a memory access without auto-precharge may be initiated at 319, thus leaving the accessed page open after the completion of the memory access. In embodiments where the auto-precharge function is not implemented, if a page conflict is predicted at 313, then an explicit close command may be issued subsequently to the memory access in order to close the page addressed by the memory access.

In other embodiments, other prediction mechanisms may be used to control the closing of the page. These mechanisms may supplement or override the mechanism of FIG. 3. For example, if the memory controller includes a mechanism to buffer memory access requests and determine which pages are going to be accessed, and if the next access to the bank will be to the currently open page, then the controller may not close the page even if the next memory access is predicted to cause a page conflict.

Figure 4:
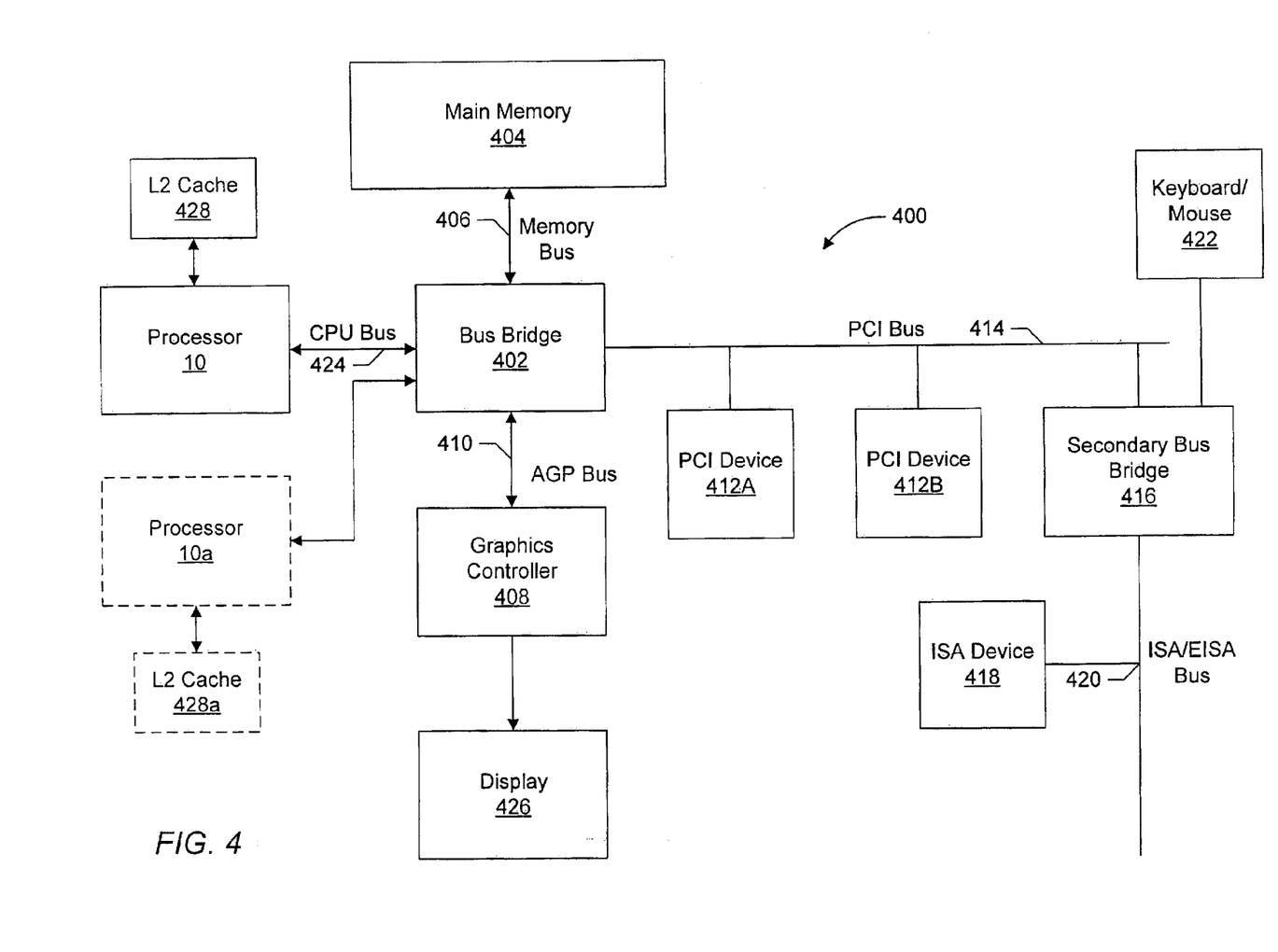
FIGS. 4 and 5 are block diagrams of exemplary computer systems that may include a memory system that performs dynamic page conflict prediction, according to some embodiments.

FIG. 4 shows a block diagram of one embodiment of a computer system 400 that includes a processor 10 coupled to a variety of system components through a bus bridge 402. Computer system 400 may include an embodiment of a memory system that performs dynamic conflict prediction, like the ones illustrated in FIGS. 1–2. For example, an embodiment of such a memory controller may be included in processor 10 and/or bus bridge 402. Note that the illustrated embodiment is merely exemplary, and other embodiments of a computer system are possible and contemplated. In the depicted system, a main memory 404 is coupled to bus bridge 402 through a memory bus 406, and a graphics controller 408 is coupled to bus bridge 402 through an AGP bus 410. Several PCI devices 412A–412B are coupled to bus bridge 402 through a PCI bus 414. A secondary bus bridge 416 may also be provided to accommodate an electrical interface to one or more EISA or ISA devices 418 through an EISAIISA bus 420. In this example, processor 10 is coupled to bus bridge 402 through a CPU bus 424 and to an optional L2 cache 428. In some embodiments, the processor 10 may include an integrated L1 cache (not shown).

Bus bridge 402 provides an interface between processor 10, main memory 404, graphics controller 408, and devices attached to PCI bus 414. When an operation is received from one of the devices connected to bus bridge 402, bus bridge 402 identifies the target of the operation (e.g., a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus. Bus bridge 402 may include a memory controller 100 as described above in some embodiments. In other embodiments, certain functionality of bus bridge 402, including that provided by memory controller 100, may be integrated into processors 10 and 10a.

In addition to providing an interface to an ISA/EISA bus for PCI bus 414, secondary bus bridge 416 may incorporate additional functionality. An input/output controller (not shown), either external from or integrated with secondary bus bridge 416, may also be included within computer system 400 to provide operational support for a keyboard and mouse 422 and for various serial and parallel ports. An external cache unit (not shown) may also be coupled to CPU bus 424 between processor 10 and bus bridge 402 in other embodiments. Alternatively, the external cache may be coupled to bus bridge 402 and cache control logic for the external cache may be integrated into bus bridge 402. L2 cache 428 is shown in a backside configuration to processor 10. It is noted that L2 cache 428 may be separate from processor 10, integrated into a cartridge (e.g., slot 1 or slot A) with processor 10, or even integrated onto a semiconductor substrate with processor 10.

Main memory 404 is a memory in which application programs are stored and from which processor 10 primarily executes. A suitable main memory 404 includes DRAM (Dynamic Random Access Memory). For example, a plurality of banks of SDRAM (Synchronous DRAM) or Rambus DRAM (RDRAM) may be suitable.

PCI devices 412A–412B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures that can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

Figure 5:
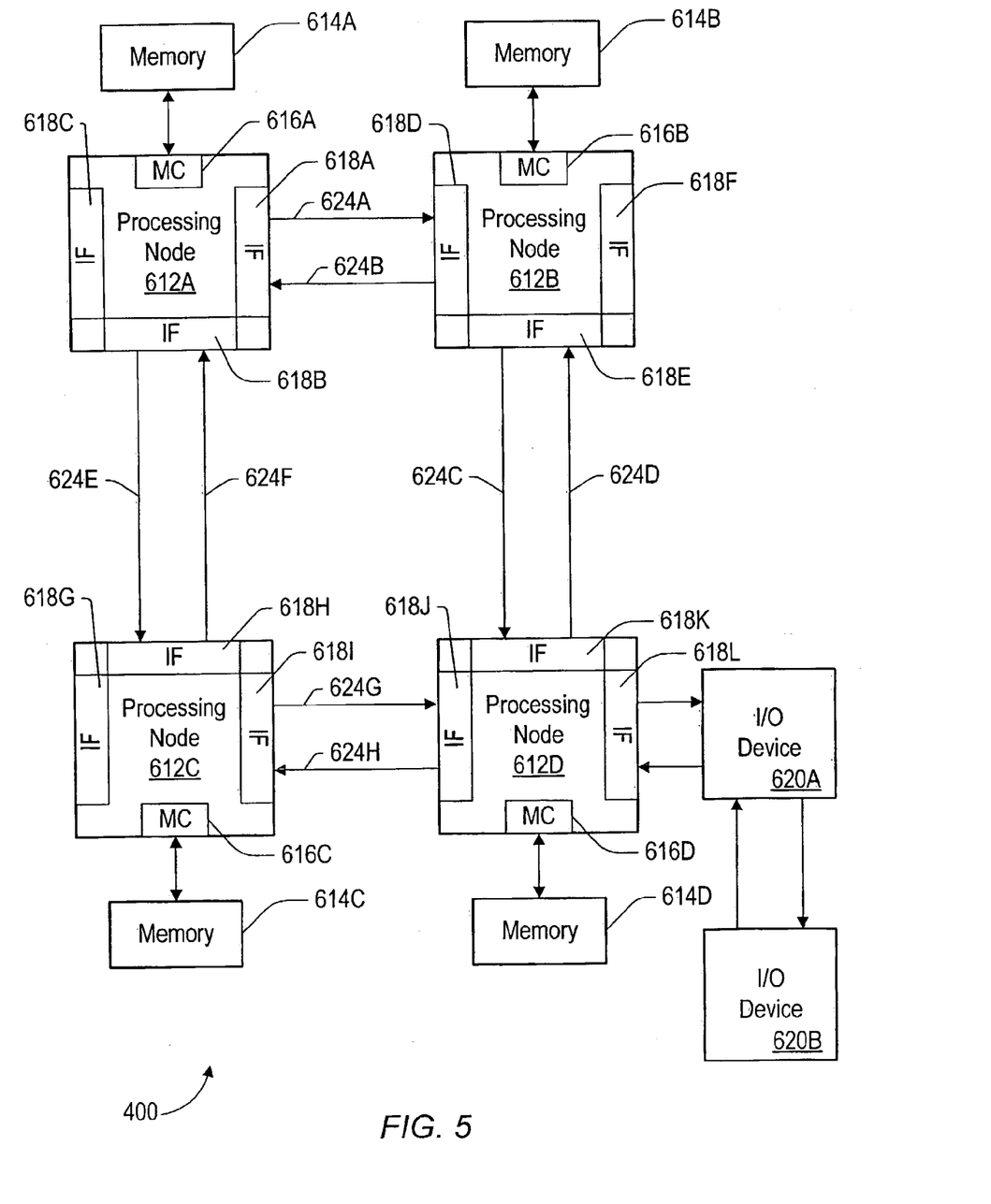

It is noted that, while the AGP, PCI, and ISA or EISA buses have been used as examples in the above description, any bus architectures may be substituted as desired. It is further noted that computer system 400 may be a multiprocessing computer system including additional processors (e.g., processor 10a shown as an optional component of computer system 400). Processor 10a may be similar to processor 10. More particularly, processor 10a may be an identical copy of processor 10. Processor 10a may be connected to bus bridge 402 via an independent bus (as shown in FIG. 5) or may share CPU bus 424 with processor 10. Furthermore, processor 10a may be coupled to an optional L2 cache 428a similar to L2 cache 428.

Turning now to FIG. 5, another embodiment of a computer system 400 that may include a memory controller 100 as described above is shown. Other embodiments are possible and contemplated. In the embodiment of FIG. 5, computer system 400 includes several processing nodes 612A, 612B, 612C, and 612D. Each processing node is coupled to a respective memory 614A–614D via a memory controller 616A–616D included within each respective processing node 612A–612D. Note that memory controllers may each be integrated with their respective processor in some embodiments. Additionally, processing nodes 612A–612D include interface logic used to communicate between the processing nodes 612A–612D. For example, processing node 612A includes interface logic 618A for communicating with processing node 612B, interface logic 618B for communicating with processing node 612C, and a third interface logic 618C for communicating with yet another processing node (not shown). Similarly, processing node 612B includes interface logic 618D, 618E, and 618F; processing node 612C includes interface logic 618G, 618H, and 618I; and processing node 612D includes interface logic 618J, 618K, and 618L. Processing node 612D is coupled to communicate with a plurality of input/output devices (e.g., devices 620A–620B in a daisy chain configuration) via interface logic 618L. Other processing nodes may communicate with other 110 devices in a similar fashion.

Processing nodes 612A–612D implement a packet-based link for inter-processing node communication. In the present embodiment, the link is implemented as sets of unidirectional lines (e.g., lines 624A are used to transmit packets from processing node 612A to processing node 612B and lines 624B are used to transmit packets from processing node 612B to processing node 612A). Other sets of lines 624C–624H are used to transmit packets between other processing nodes as illustrated in FIG. 5. Generally, each set of lines 624 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 612A to processing node 612D may pass through either processing node 612B or processing node 612C as shown in FIG. 5. Any suitable routing algorithm may be used. Other embodiments of computer system 400 may include more or fewer processing nodes then the embodiment shown in FIG. 5.

Generally, the packets may be transmitted as one or more bit times on the lines 624 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 612A–612D, in addition to a memory controller and interface logic, may include one or more processors. Broadly speaking, a processing node includes at least one processor and may optionally include a memory controller for communicating with a memory and other logic as desired. More particularly, each processing node 612A–612D may include one or more copies of processor 10. External interface unit 612D may include the interface logic 618 within the node, as well as the memory controller 616D. Each memory controller 616 may include an embodiment of memory controller 100, as described above.

Memories 614A–614D may include any suitable memory devices. For example, a memory 614A–614D may include one or more RAMBUS DRAMs (RDRAMs), synchronous DRAMs (SDRAMs), static RAM, etc. The address space of computer system 400 is divided among memories 614A–614D. Each processing node 612A–612D may include a memory map used to determine which addresses are mapped to which memories 614A–614D, and hence to which processing node 612A–612D a memory request for a particular address should be routed. In one embodiment, the coherency point for an address within computer system 400 is the memory controller 616A–616D coupled to the memory storing bytes corresponding to the address. In other words, the memory controller 616A–616D is responsible for ensuring that each memory access to the corresponding memory 614A–614D occurs in a cache coherent fashion. Memory controllers 616A–616D may include control circuitry for interfacing to memories 614A–614D. Additionally, memory controllers 616A–616D may include request queues for queuing memory requests.

Interface logic 618A–618L may include a variety of buffers for receiving packets from the link and for buffering packets to be transmitted upon the link. Computer system 400 may employ any suitable flow control mechanism for transmitting packets. For example, in one embodiment, each interface logic 618 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 620A–620B may be any suitable I/O devices. For example, I/O devices 620A–620B may include devices for communicating with another computer system to which the devices may be coupled (e.g., network interface cards or modems). Furthermore, I/O devices 620A–620B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

Numerous variations and modifications will become apparent to those skilled in the art once the above disclosure is fully appreciated. It is intended that the following claims be interpreted to embrace all such variations and modifications.

What is claimed is:

1. A memory controller, comprising:
a page history register configured to store a value indicating a history of memory access requests;
a global conflict predictor comprising a plurality of conflict prediction registers, wherein each of the plurality of conflict prediction registers is associated with a respective value of the page history register; and
a control unit coupled to the page history register and the global conflict predictor, wherein in response to receiving a memory access request to access a page, the control unit is configured to update the value of the page history register;
wherein in response to receiving the memory access request, the control unit is configured to modify a value of the conflict prediction register associated with the value of the page history register dependent on whether the memory access request causes a page conflict;
wherein the control unit is configured to determine whether to automatically close a page targeted by the memory access request upon completion of the access requested by the memory access request dependent on a value in one of the plurality of conflict prediction registers.

2. The memory controller of claim 1, wherein the page history register contains J bits, wherein one bit corresponds to whether the memory access request causes a page conflict, wherein each of the other J–1 bits corresponds to whether a respective one of J–1 previous memory access requests caused page conflicts.

3. The memory controller of claim 1, wherein the page history register comprises a shift register, wherein the control unit is configured to update the value of the page history register by shifting a bit representing whether the memory access request causes a page conflict into the shift register.

4. The memory controller as recited in claim 1, wherein the global conflict predictor comprises $2^{J-1}$ conflict prediction registers, wherein J is a number of bits in the page history register.

5. The memory controller of claim 1, wherein each of the plurality of conflict prediction registers is configured to store a value corresponding to a level of certainty that a next memory access request will cause a page conflict.

6. The memory controller of claim 1, wherein the control unit is configured to increase the value stored in the conflict prediction register associated with the value of the page history register if the memory access request causes a page conflict.

7. The memory controller of claim 6, wherein the control unit is configured to increase the value stored in the conflict prediction register associated with the value of the page history register by a fixed amount if the memory access request causes a page conflict.

8. The memory controller of claim 1, wherein the control unit is configured to decrease the value stored in the conflict prediction register associated with the value of the page history register if the memory access request does not cause a page conflict.

9. The memory controller of claim 8, wherein the control unit is configured to decrease the value stored in the conflict prediction register associated with the value of the page history register by a fixed amount if the memory access does not cause a page conflict.

10. The memory controller of claim 1, wherein the conflict prediction register associated with the value of the page history register is the same conflict prediction register as the one of the plurality of conflict prediction registers whose value is used by the control unit to determine whether to automatically close the page addressed by the memory access request upon completion of the access requested by the memory access request.

11. The memory controller of claim 1, wherein the control unit is configured to update the global conflict predictor in response to each memory access request.

12. The memory controller of claim 1, wherein the control unit is configured to automatically close the page upon completion of the memory access requested by the memory access request if the value in the one of the plurality of conflict prediction registers is greater than a threshold value.

13. The memory controller of claim 1, wherein the control unit is configured leave the page open upon completion of the memory access requested by the memory access request if the value in the one of the plurality of conflict prediction registers is less than the threshold value.

14. The memory controller of claim 1, wherein the control unit is configured to automatically close the page upon completion of the memory access by initiating the memory access in auto-precharge mode.

15. The memory controller of claim 1, further comprising N page history registers, wherein the page history register is included in the N page history registers, wherein each page history register corresponds to a different bank, wherein N is an integer greater than one.

16. A computer system, comprising:
a memory device comprising a plurality of memory banks, wherein each of the plurality of memory banks comprises a plurality of memory pages; and
a memory controller coupled to the memory device and comprising a control unit, a page conflict history register, and a plurality of conflict prediction registers, wherein each of the plurality of conflict prediction registers is associated with a respective value of the page conflict history register;
wherein in response to a memory access request targeting one of the plurality of pages comprised in one of the plurality of banks, the control unit is configured to access one of the plurality of conflict prediction registers associated with a value of the page conflict history register to predict whether a next memory access request will cause a page conflict;
wherein if the control unit predicts that the next memory access request will cause a page conflict, the memory controller is configured to automatically close the one of the plurality of pages targeted by the memory access request upon completion of the access requested in the memory access request;
wherein, dependent on whether the memory access request causes a page conflict, the control unit is further configured to update one of the plurality of conflict prediction registers and to update the page history register.

17. The computer system of claim 16, wherein the memory controller is integrated with a processor, wherein the processor is configured to generate a plurality of memory access requests.

18. The computer system of claim 16, wherein the one of the plurality of conflict prediction registers accessed by the control unit to predict whether the next memory access request will cause a page conflict is the one of the plurality of conflict prediction registers updated by the control unit.

19. The computer system of claim 16, wherein the control unit is configured to update the one of the plurality of conflict prediction registers by increasing a value stored in the one of the plurality of conflict prediction registers if the memory access request causes a page conflict.

20. The computer system of claim 16, wherein the control unit is configured to update the one of the plurality of conflict prediction registers by decreasing the value stored in the one of the plurality of conflict prediction registers if the memory access request does not cause a page conflict.

21. The computer system of claim 16, wherein the memory controller comprises N page history registers, wherein the page history register is included in the N page history registers, and wherein each page history register corresponds to a different one of the plurality of banks, included in the memory device.

22. The computer system of claim 16, wherein the memory controller is configured to automatically close the one of the plurality of pages targeted by the memory access request upon completion of the access requested in the memory access request by initiating the access in auto-precharge mode.

23. The computer system of claim 16, wherein the one of the plurality of conflict prediction registers updated by the control unit is associated with a value of the page conflict history register prior to the control unit updating the page conflict history register.

24. The computer system of claim 16, wherein the one of the plurality of conflict prediction registers accessed by the control unit is associated with a value of the page conflict history register subsequent to the control unit updating the page conflict history register.

25. A method, comprising:
receiving a memory access request targeting a page of memory;
modifying one of a plurality of conflict predictions dependent on whether the memory access request causes a page conflict;
updating a page history to indicate whether the memory access request causes a page conflict;
predicting whether a next memory access request will cause a page conflict dependent on a respective one of the plurality of conflict predictions associated with a value of the page history; and
if said predicting predicts that the next memory access will cause a page conflict, automatically closing the page targeted by the memory access request upon completion of a memory access initiated in response to said receiving.

26. The method of claim 25, wherein said modifying modifies the one of the plurality of conflict predictions associated with a value of the page history that is used in said predicting.

27. The method of claim 25, wherein said modifying comprises increasing the value of the conflict prediction if the memory access request causes a page conflict.

28. The method of claim 25, wherein said modifying comprises decreasing the value of the conflict prediction if the memory access request does not cause a page conflict.

29. The method of claim 25, wherein said updating comprises shifting a value indicating whether the memory access request causes a page conflict into a shift register that stores the page history.

30. The method of claim 25, wherein said predicting comprises comparing the value of the one of the plurality of conflict predictions associated with the value of the page history to a threshold value;
   wherein if the value of the one of the plurality of conflict predictions associated with the value of the page history is greater than or equal to the threshold value, said predicting comprises predicting a page conflict; and
   wherein if the value of the one of the plurality of conflict predictions associated with the value of the page history is less than the threshold value, said predicting comprises predicting no page conflict.

31. The method of claim 25 wherein said automatically closing the page comprises performing the memory access to the page in auto-precharge mode.

32. The method of claim 25, further comprising maintaining a plurality of page history values, wherein each of the plurality of page history values is associated with a respective one of a plurality of memory banks.

33. A system, comprising:
   means for determining whether a memory access request causes a page conflict;
   means for modifying a value of one of a plurality of conflict predictions in response to determining that the memory access request causes a page conflict;
   means for updating a value of a page history in response to the memory access request;
   means for predicting whether a next memory access request to a bank will cause a page conflict dependent on a value of a respective one of the plurality of conflict predictions associated with the value of the page history; and
   means for automatically closing a page targeted by the memory access request upon completion of a memory access requested by the memory access request if the next memory access to the bank is predicted to cause a page conflict.

* * * * *